United States Patent
Han

(10) Patent No.: US 7,146,438 B2
(45) Date of Patent: Dec. 5, 2006

(54) DEVICE AND METHOD FOR CONTROLLING PACKET FLOW

(75) Inventor: Kyu-Wook Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 404 days.

(21) Appl. No.: 10/694,696

(22) Filed: Oct. 28, 2003

(65) Prior Publication Data
US 2004/0088451 A1 May 6, 2004

(30) Foreign Application Priority Data
Nov. 1, 2002 (KR) ............... 10-2002-0067573

(51) Int. Cl.
G06F 11/00 (2006.01)
G06F 15/16 (2006.01)
G06F 3/00 (2006.01)

(52) U.S. Cl. ............... 710/29; 370/229; 370/230; 370/235; 709/233; 710/1

(58) Field of Classification Search ............... 370/229, 370/230, 232, 234, 235; 709/207, 233, 235, 709/240; 710/29, 41, 52, 60, 61, 111, 240, 710/244
See application file for complete search history.

(56) References Cited

U.S. PATENT DOCUMENTS 6,717,951 B1 * 4/2004 Stanton et al. ............... 370/418
6,981,054 B1 * 12/2005 Krishna ............... 709/235
2002/0136163 A1 * 9/2002 Kawakami et al. ......... 370/229

FOREIGN PATENT DOCUMENTS

KR   2001-0045783   6/2001

OTHER PUBLICATIONS

Ken Bigelow; Digital Logic; 1996; www.play-hookey.com/digital/; pp. 1-2.*

* cited by examiner

Primary Examiner—Fritz Fleming
Assistant Examiner—Richard B. Franklin, Jr.
(74) Attorney, Agent, or Firm—Mills & Onello LLP

(57) ABSTRACT

In a device and method for controlling packet flow, priority data of a packet received by one of a plurality of ports are determined. A packet memory is monitored to determine whether an address pointer of the packet memory exceeds a predetermined limit value. A port is selected to control packet flow by using the priority data when the address pointer of the packet memory exceeds the predetermined limit value. Then, the selected port is directed to control the packet flow. By using the priority data designated to a packet or a port, the packet flow may be controlled in consideration of various kinds of network services.

15 Claims, 11 Drawing Sheets

FIG. 11

| PORT | PRIORITY | BANDWIDTH | PORT STATE |
|---|---|---|---|
| 1 | H | H | H |
| 2 | L | H | H |
| 3 | L | L | L |
| 4 | L | L | L |
| 5 | H | H | H |
| 6 | L | L | L |
| 7 | H | L | H |
| 8 | L | L | L |

FIG. 12

| PORT | PRIORITY | PORT STATE |
|---|---|---|
| 1 | 3 | 3 |
| 2 | 5 | 5 |
| 3 | 7 | 7 |
| 4 | 6 | 6 |
| 5 | 8 | 8 |
| 6 | 2 | 2 |
| 7 | 4 | 4 |
| 8 | 5 | 5 |

DEVICE AND METHOD FOR CONTROLLING PACKET FLOW

RELATED APPLICATIONS

The present application claims priority from Korean Patent Application No. 2002-67573, filed on Nov. 1, 2002, the disclosure of which is hereby incorporated herein by reference in its entirety.

BACKGROUND OF THE INVENTION

1. Field of the Invention

The present invention relates to a device and a method for controlling packet flow, and more particularly to a device and a method for controlling packet transmission from a station when a packet memory of a device such as a switch or a router is in a state of physical saturation.

2. Description of the Related Art

In the data transmission between two stations, the packet memory of a switch can be classified according to whether it is an internal memory or an external memory. In a conventional switch system, external memory is seldom used because of associated high cost, thus internal memory is generally used. In case internal memory is used, a proper physical size for the internal memory must be chosen, while considering the physical dimension limitations of the chip.

In the field of network management, it is very important to prevent the physical saturation of the packet memory. Thus, a standard prescribes control over the packet flow between two stations. However, the standard defines only the flow control packet itself, and does not prescribe the condition for the control of packet flow so as to avoid saturation. For this reason, a network manager is utilized to set the condition.

There are two forms of conventional packet flow control methods. One is to control the packet flow by investigating the state of packet memory (hereinafter, referred to as "state method") and the other is to control the packet flow by investigating bandwidth (hereinafter, referred to as "bandwidth method").

In the state method, a hypothetical condition is set by determining the amount of packet memory consumed prior to the state of physical saturation. When the condition is satisfied, a pause packet in a full-duplex communication or a back pressure in a half-duplex communication is transmitted to prevent additional packets at the transmission station from being transmitted. Accordingly, the time to empty the packet memory can be obtained using this method.

In the bandwidth method, the network manager sets the bandwidth of the packet that is transmitted/received by a certain port to a certain value. Then, the packet transmission is controlled for the station that exceeds the allowed bandwidth.

The conventional approaches only check the remaining amount of the packet memory or the limited bandwidth of the packet to perform the packet flow control. Therefore, these conventional methods may not be effective for individual service in modern networks where various types of services coexist.

Furthermore, since the packet flow control is performed only for a source port, wherein the physical saturation of the packet memory occurs, or for all ports, the conventional methods have a disadvantage that the port requiring the packet flow control cannot be selected and controlled properly. In addition, although priority data are included in a VLAN (Virtual Local Area Network) packet or IP (Internet Protocol) packet, it is not used to control the packet flow, but only used to write the packet on the packet memory.

SUMMARY OF THE INVENTION

To overcome the aforementioned problems of the prior art, a feature of the present invention is to provide a device and a method for controlling packet flow that can satisfy individual services by controlling the packet flow through use of priority data designated to a packet or a port.

Another feature of the present invention is to provide a device and a method for controlling packet flow that can selectively control the port where the packet flow control is needed by use of priority data.

Still another feature of the present invention is to provide a device and a method for controlling packet flow that can selectively control the port where the packet flow control is needed by use of priority data and bandwidth data together.

According to one aspect of the present invention, in a method for controlling packet flow, after determining a priority data of a packet received by one of a plurality of ports, a packet memory is monitored to determine whether an address pointer of the packet memory exceeds a predetermined limit value. A port is selected to control packet flow by using the priority data when the address pointer of the packet memory exceeds the predetermined limit value, and the selected port is directed to control the packet flow.

According to another aspect of the present invention, in a method for controlling a packet flow, after determining priority data of a packet received by one of a plurality of ports, bandwidth data of each port are measured to output state data of each port by the use of the priority data and the bandwidth data. Then, it is determined whether an address pointer of the packet memory exceeds a predetermined limit value by monitoring packet memory. A port is selected to control a packet flow by using the state data when the address pointer of the packet memory exceeds the predetermined limit value, and the selected port is directed to control the packet flow.

According to another aspect of the present invention, a packet flow control device comprises a plurality of port control units being respectively coupled to each port for determining a priority data of a packet received by a port, and a queue manager for monitoring state of a packet memory, and selecting a port to direct a flow control by using the priority data determined by the port control units when an address pointer of the packet memory exceeds a predetermined limit value.

Each of the plurality of port control units may comprise a bandwidth control section for measuring a bandwidth data of a port, a priority outputting section for determining the priority data of a packet received by port, and a flow control directing section for requesting a port to produce a flow control packet in response to a flow control signal for directing the flow control from said queue manager.

According to another aspect of the present invention, the queue manager may comprise a limit value detecting section for detecting whether the address pointer exceeds the limit value, a flow control determining section for directing the port in a predetermined state to control the packet flow when the address pointer exceeds the limit value, a port state determining section for determining the state of the port by receiving output signals of the bandwidth control section and the priority outputting section, and a flow control signal transmitting section for selecting the port in the predetermined state according to the data output by the port state determining section and transmitting a flow control signal to the port control unit of the selected port in response to a flow control direction of the flow control directing section.

BRIEF DESCRIPTION OF THE DRAWINGS

The above and other advantages of the present invention will become more apparent by describing an exemplary embodiment in detail thereof with reference to the accompanying drawings, in which:

FIG. 11 is an example of a table for determining port states in a port state determining section; and FIG. 12 is another example of a table for determining port states in a port state determining section.

DETAILED DESCRIPTION OF PREFERRED EMBODIMENTS

Figure 1:
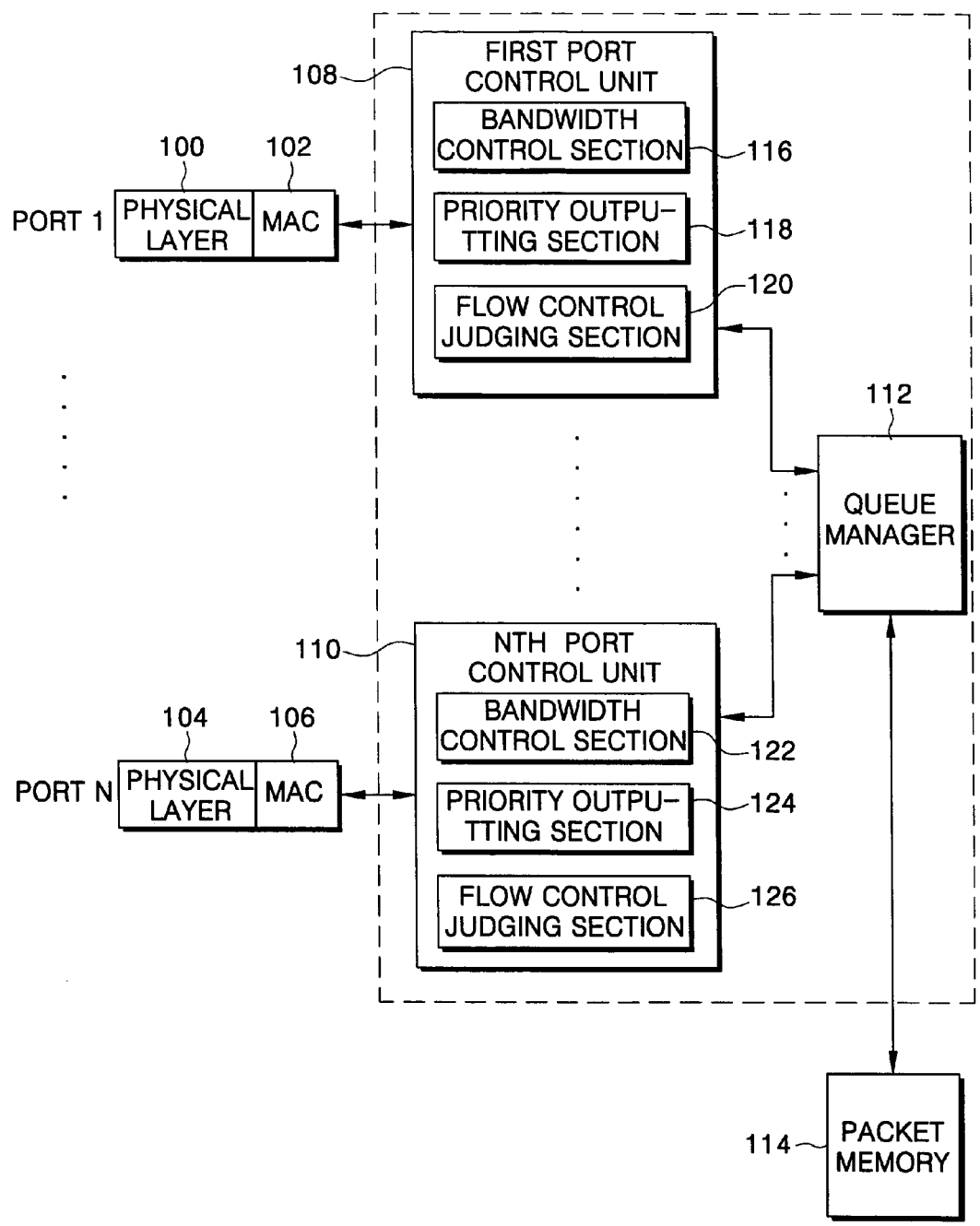
FIG. 1 is a block diagram illustrating the overall structure of a packet flow control device according to one embodiment of the present invention.

FIG. 1 is a block diagram illustrating the structure of a packet flow control device according to one embodiment of the present invention.

As shown in FIG. 1, a packet flow control device according to one embodiment of the present invention comprises a plurality of port control units 108, 110 and a queue manager 112.

The respective port control units 108 and 110 connected with respective ports PORT_1 . . . PORT_N each comprise a bandwidth control section 116 and 122, a priority outputting section 118 and 124, and a flow control judging section 120 and 126.

The packet flow control device as shown in FIG. 1 may, for example, be integrated into a router, a switch or any other device for performing packet flow control function, and also may be embodied as a separate device for performing packet flow control function.

In FIG. 1, the Media Access Control (MAC) 102, 106 is a data link layer, a second layer among seven layers in an Open System Interface (OSI) reference model. MAC 102, 106 communicates with a physical layer 100, 104 as a first layer in the OSI reference model and the respective port control units 108, 110 connected with the MAC 102, 106.

That is, the MAC 102, 106 uses the Carrier Sense Multiple Access (CSMA) with Collision Detection (CD) protocol restoring IEEE 802.3 MAC frames from the data received from the physical layer 100, 104. The MAC 102, 106 transfers a packet including the IEEE 802.3 MAC frame to the respective port control unit 108, 110. Also, the MAC 102, 106 creates an IEEE 802.3 MAC frame with the data received from the respective port control unit 108, 110 and transfers a packet including the IEEE 802.3 MAC frame to the physical layer 100, 104.

When packet flow control is required, the port control unit 108, 110 directs the MAC 102, 106 to control packet flow. Then, the MAC 102, 106 creates a flow control packet, and transfers it to physical layer 100, 104.

In general, a port control unit performs the function of writing data to transmit in a packet memory 114 and reading data to receive from the packet memory 114. When the port control unit writes or reads the data, the port control unit receives memory address pointer information for writing or reading data from a queue manager 112. Also, the port control unit determines a packet destination address and a packet source address by using the header information of a received packet. Here, the address may be a MAC address or an IP address. The port control unit can determine the type of the received packet by protocol analysis. In addition, the port control unit determines whether or not the received packet is a VLAN packet by header information analysis.

When the port control unit determines the packet destination address by analyzing the header information, the port control unit determines which port corresponds to the packet destination address by directing a look-up engine to determined the address.

The function of a general port control unit is described above. As shown in FIG. 1, a port control unit 108, 110 in accordance with the present invention comprises a bandwidth control section 116, 122, a priority outputting section 118, 124, and a flow control instructing section 120, 126.

The bandwidth control section 116, 122 performs the function of determining whether or not the measured bandwidth of a packet exceeds the predetermined bandwidth by measuring the bandwidth of a packet transferred to a port. According to one embodiment of the present invention, the bandwidth control section 116, 122 measures the bandwidth of a packet by counting units of a packet.

According to the present invention, the packet flow control device controls packet flow in response to the bandwidth measuring result by the bandwidth control section 116, 122 or irrespective of the bandwidth measuring result by the bandwidth control section 116, 122. That is, the bandwidth control section 116, 122 according to the resent invention is not indispensable (or essential).

The priority outputting section 118, 124 determines the priority of a packet transferred to the port and outputs the determined result. As mentioned above, the priority data in a packet are used in a conventional system in order to write data in the packet memory. However, in the conventional system, the priority data were not used for controlling packet flow.

According to the present invention, however, the priority data output by the priority outputting section 118, 124 of the port control unit 108, 110 may be used for controlling the packet flow.

The standard provides the method for deciding the priority data in case of the IP packet or VLAN packet. According to the standard, both the IP packet and the VLAN packet are grouped into eight different priorities. For example, a low priority is assigned for certain data, e.g. the electronic mail that are not required to transmit quickly, and a high priority is assigned for other certain data, e.g. broadcasting data that are required to be transmitted in real-time.

Also, the priority can be assigned based the port. For example, the high priority may be assigned to the packet transmitted to the predetermined port.

The priority outputting section 118, 124 outputs a priority outputting signal in consideration of both the case that the priority is assigned for a packet and the case that the priority is assigned for a port. The method for outputting the priority data is described below with reference to another drawing.

The flow control instructing section 120, 126 performs the function of directing the MAC 102, 106 to create the flow control packet, when the flow control instructing section 120, 126 receives the flow direction signal from the queue manager 112. The flow control packet created by the MAC 102, 106 comprises time information. The station receiving the flow control packet analyzes the time information in the packet and does not transmit the packet during the time period corresponding to the time information.

The queue manager 112 monitors the state of the packet memory and determines whether or not the packet flow control is required. According to one embodiment of the present invention, the queue manager 112 sets the limit value of packet memory. The queue manager 112 determines whether or not the packet flow controls are necessary by monitoring whether or not the memory address pointer exceeds the limit value. The method for setting the limit value, in order to determine the necessity of the packet flow controls, shall be described below.

The queue manager 112 selects a port for controlling the packet flow when the flow control is required. The queue manager 112 receives the bandwidth data from the bandwidth control section 116, 122 of the port control unit 108, 110 and the priority data from the priority outputting section 118, 124. The queue manager 112 selects a port for controlling the packet flow. As mentioned above, the use of bandwidth data for selecting a port is optional. The method for selecting a port for controlling the packet flow using the bandwidth data and the priority data is described below.

According to the conventional approach, since flow control is managed for all ports or a source port in response to memory saturation state, appropriate flow control cannot be performed. However, according to the present invention, since a port requiring flow control is selected using the priority data of a packet, the appropriate flow control may be realized.

Also, the queue manager 112 sends the memory address pointer information for reading or writing data to the port control unit 108, 110.

Figure 2:
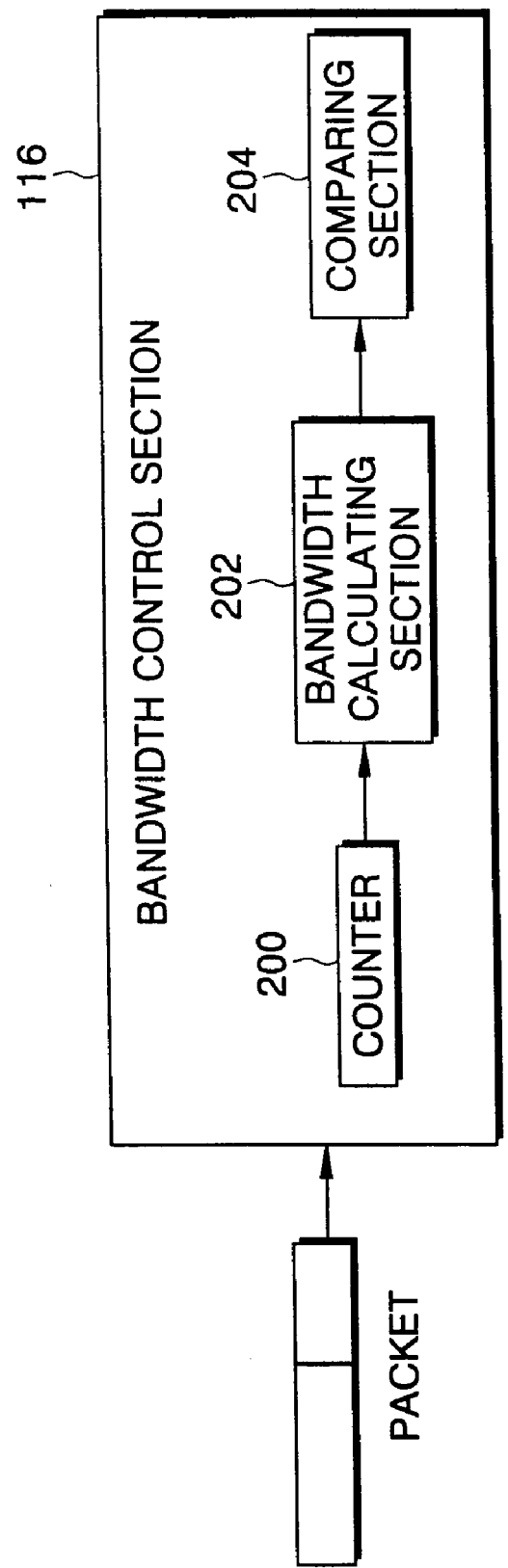
FIG. 2 is a block diagram illustrating the bandwidth control section according to one embodiment of the present invention.

FIG. 2 is a block diagram illustrating the structure of bandwidth control section according to one embodiment of the present invention.

As shown in FIG. 2, the bandwidth control section comprises a counter 200, a bandwidth calculating section 202 and a comparing section 204.

The counter 200 performs the function of counting the received packet whenever the packet is received. The output signal of the counter 200 is input to the bandwidth calculating section 202.

The bandwidth calculating section 202 receives the output signal of the counter 200 and calculates the average bandwidth by dividing the counting result into the predetermined time period. When the bandwidth for a period is calculated, the bandwidth calculating section 202 transfers a reset signal to the counter 200, and the counter 200 counts the number of newly received packets.

The comparing section 204 performs the function of determining whether or not the average bandwidth output by the bandwidth calculating section exceeds the predetermined limit value.

According to one embodiment of the present invention, the comparing section 204 sets a limit value and determines whether or not the average bandwidth exceeds the limit value. When the average bandwidth exceeds the limit value, the comparing section 204 may output a high signal. Otherwise, the comparing section 204 may output a low signal.

According to another embodiment of the present invention, the comparing section 204 sets a plurality of limit values, and the comparing section 204 outputs at least two bandwidth signals by comparing the average bandwidth signal with a plurality of limit values. For example, when two limit values are set, the comparing section 204 may output different signals according to relationship between the average bandwidth signals with the two limit values.

Until now, the bandwidth control section for measuring bandwidth by counting the packet has been described above with reference to FIG. 2. It is evident, however, that many modifications and variations such as methods for calculating bandwidth will be apparent to those having ordinary skill in the art.

Figure 3:
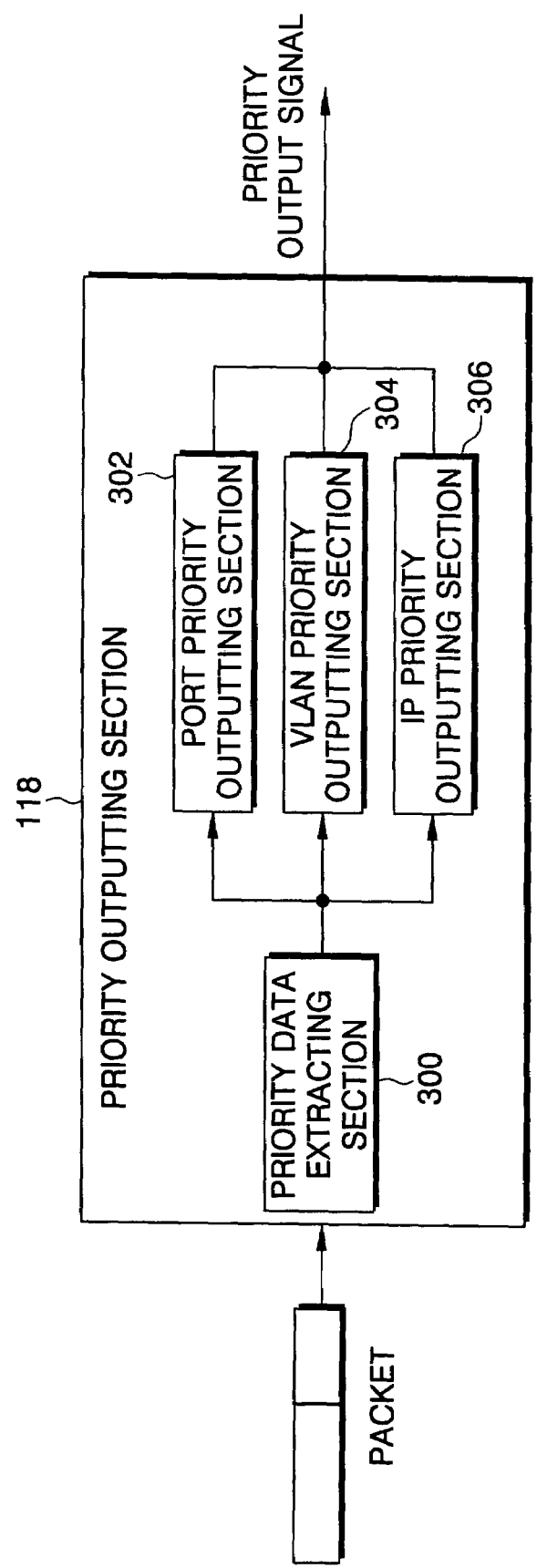
FIG. 3 is a block diagram illustrating the priority outputting section according to one embodiment of the present invention.

FIG. 3 is a block diagram illustrating the structure of priority outputting section 118, 124 according to one embodiment of the present invention.

As shown in FIG. 3, the priority outputting section according to one embodiment of the present invention comprises a priority data extracting section 300, a port priority outputting section 302, a VLAN priority outputting section 304, and an IP priority outputting section 306.

The priority data extracting section 300 performs the function of determining how the priority is assigned by analyzing a received packet.

As mentioned above, the priority can be assigned in header information of the packet or for a port itself. Also, the priority can be assigned differently based on whether the packet is an Internet Protocol (IP) packet or a Virtual Local Area Network (VLAN) packet.

Therefore, the priority data extracting section 300 determines whether or not the priority is assigned for a port. Further, the priority data extracting section 300 extracts the priority data after determining the type of packet when the priority is not assigned for the port.

When the priority is assigned for the port, the priority data extracting section 300 transmits the extracted priority data to the port priority outputting section 302. When the received packet is a VLAN packet, the priority data extracting section 300 transmits the received packet to the VLAN priority outputting section 304. When the received packet is an IP packet, the priority data extracting section 300 transmits the received packet to the IP priority outputting section 306.

In order to describe the method for extracting the priority data by determining the type of the packet in priority data extracting section 300, the field structure of the header information of the IP packet and the VLAN packet is described as follows.

Figure 4:
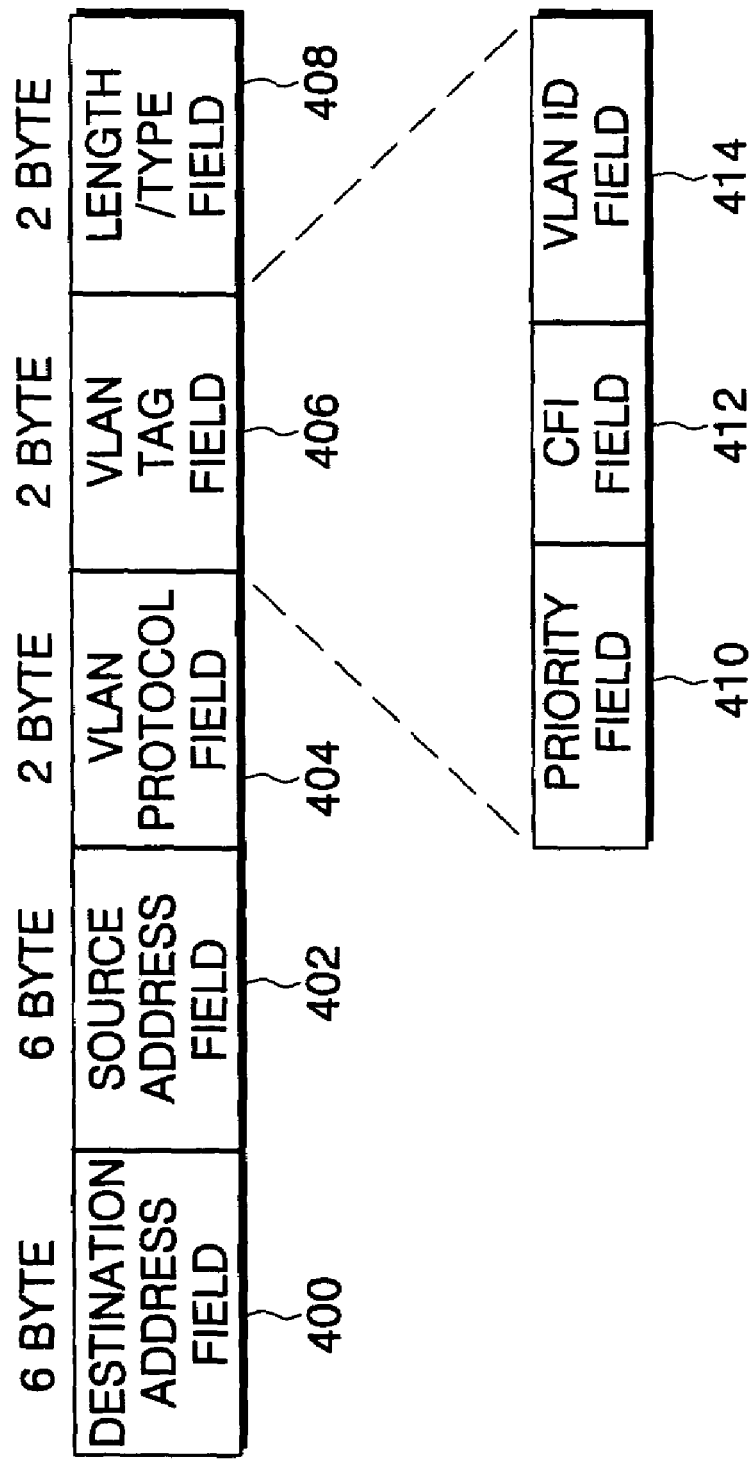
FIG. 4 is a diagram illustrating the field structure of VLAN packet header information.

FIG. 4 is a diagram illustrating the field structure of VLAN packet header information.

As shown in FIG. 4, the header information of VLAN field comprises a destination address field 400, a source address field 402, a VLAN protocol field 404, a VLAN tag field 406, and a length/type field 408. The VLAN tag field 406 comprises a priority field 410, a CFI field 412, and a VLAN ID field 414.

Returning to FIG. 3, the priority data extracting section 300 determines whether or not the received packet is a VLAN packet using the VLAN protocol field 404. That is, the VLAN protocol field exists in the thirteenth and fourteenth bytes of the packet. Therefore, the packet flow control device counts until the twelfth byte but the packet flow control device determines whether or not the received packet is a VLAN packet using the data in the thirteenth and fourteenth bytes.

When the receive packet is the VLAN packet, the priority data extracting section 300 extracts the data of the priority field 410 of the VLAN tag field 406. Later, the priority data extracting section 300 transfers the extracted data to the VLAN priority outputting section 304.

Figure 5:
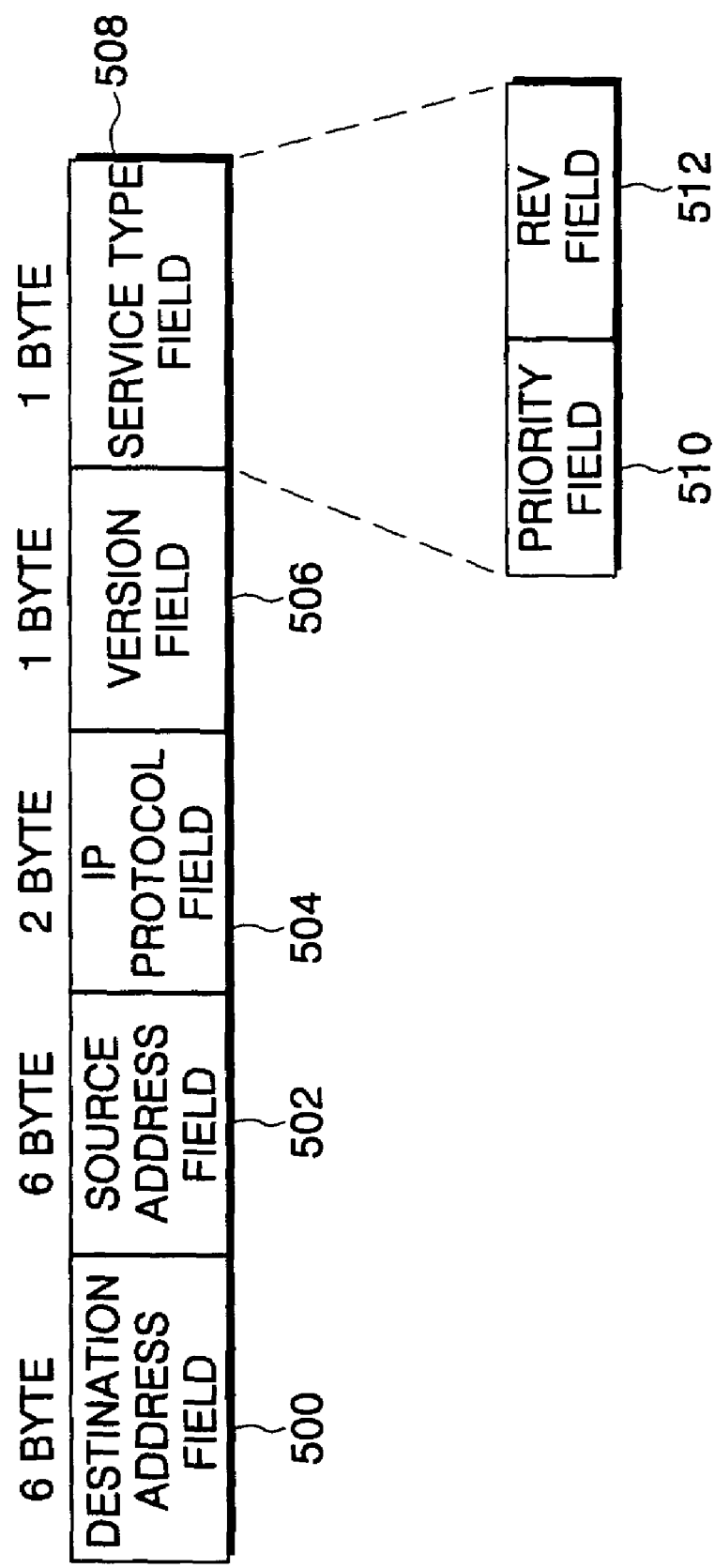
FIG. 5 is a diagram illustrating the field structure of IP packet header information.

FIG. 5 is a diagram illustrating the field structure of IP packet header information. As shown in FIG. 5, the header information of the IP packet comprises a destination address field 500, a source address field 502, an IP protocol field 504, a version field 506, and a service type field 508. The service type field 508 comprises a priority field 510 and a rev field 512.

Returning to FIG. 3, the priority data extracting section 300 determines whether or not the received packet is an IP packet using the IP protocol field 504. That is, the IP protocol field exists in the thirteenth and fourteenth bytes. Therefore, the packet flow control device counts until the twelfth byte, but the packet flow control device determines whether the received packet is an IP packet using the data in the thirteenth and fourteenth bytes.

When the received packet is the IP packet, the priority data extracting section 300 extracts the data of the priority field 510 of the service type field 508 and transfers the extracted data to the IP priority outputting section 306.

When a priority is assigned for a port, the port priority outputting section 302 transmits the priority outputting signal to the queue manager 112.

The VLAN priority outputting section 304 receives the priority field data of a VLAN packet from the priority data extracting section 300 determining the priority of the VLAN packet using the priority field data.

According to one embodiment of the present invention, the VLAN priority outputting section 304 determines the priority of the VLAN packet. The VLAN priority outputting section 304 outputs a high signal when the priority exceeds the predetermined limit value and a low signal otherwise. For example, when the limit values are set as priority 5 and the priority is higher than the limit value, the VLAN priority outputting section 304 outputs a high signal.

According to another embodiment of the present invention, the VLAN priority outputting section 304 outputs the different priority outputting signal corresponding to each of the priorities.

The IP priority outputting section 306 receives the priority field data of the IP packet from the priority data extracting section 300 determining the priority of the IP packet using the priority field data.

As the VLAN packet, the IP priority outputting section 306 may output a high or a low signal by comparing the priority with the predetermined limit value, or output the different priority outputting signal corresponding to each of the priorities.

As mentioned above, the priority outputting signal output by one of the port priority outputting section 302, VLAN priority outputting section 304 and IP priority outputting section 306 may be output in various forms, and it is evident that foregoing variations will be apparent to those having ordinary skill in the art.

Figure 6:
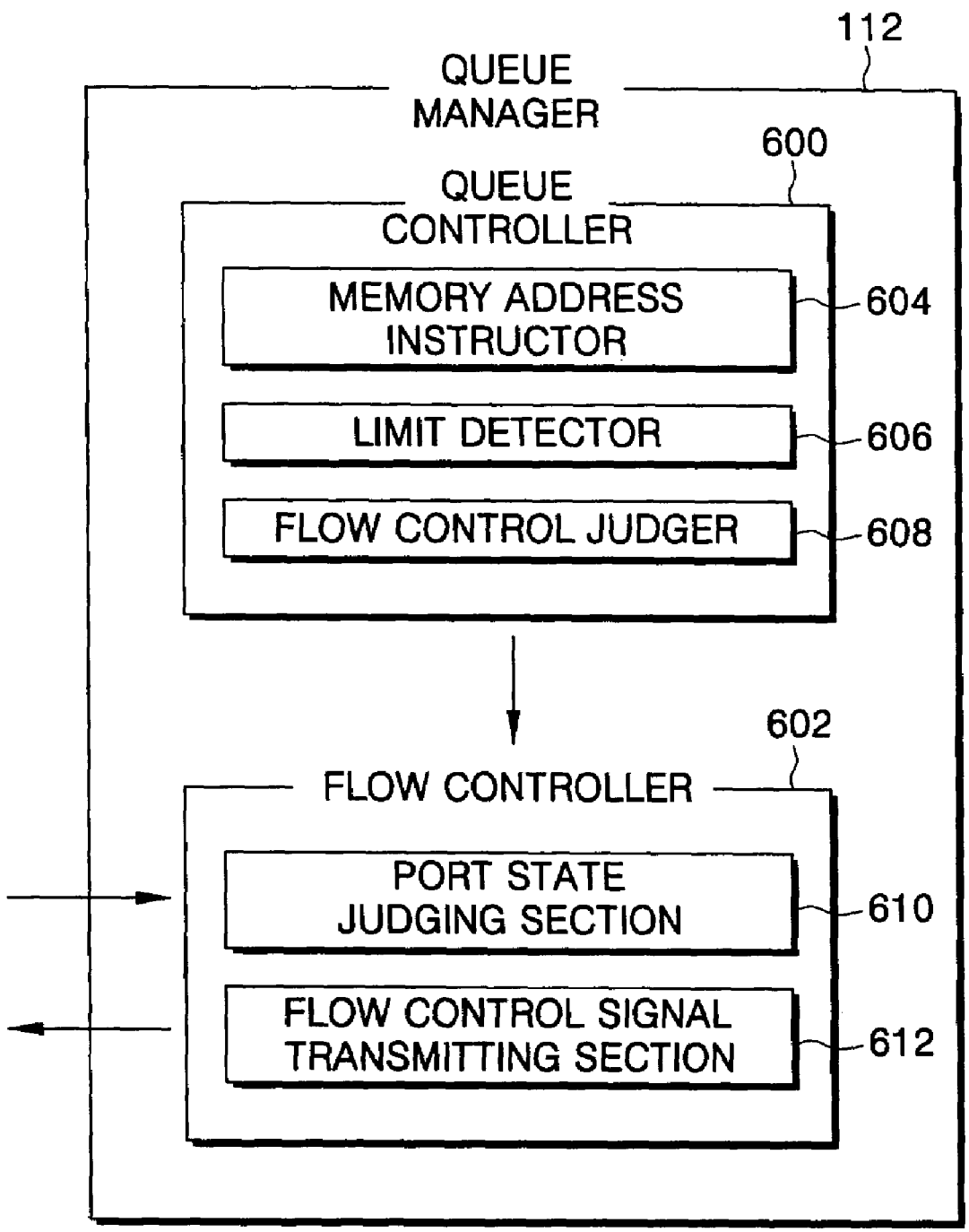
FIG. 6 is a block diagram illustrating the structure of queue manager according to one embodiment of the present invention.

FIG. 6 is a block diagram illustrating the structure of a queue manager 112 according to one embodiment of the present invention.

As shown in FIG. 6, the queue manager 112 according to one embodiment of the present invention comprises a queue controller 600 and a flow controller 602.

The queue controller 600 may comprise a memory address instructor 604, a limit detector 606 and a flow control judger 608. The flow controller 602 may comprise a port state judging section 610 and a flow control signal transmitting section 612.

The queue controller 600 performs the function of managing packet memory, and the flow controller 602 performs the function of providing a flow control signal to the pertinent port when flow control is required in response to the state of the determination result of the packet memory.

When the port control unit writes data in the packet memory or reads data from the packet memory, the memory address instructor 604 of the queue controller 600 transfers the memory address pointer corresponding to the data to the port control unit.

The limit detector 606 determines whether the address pointer of the packet memory reaches the predetermined limit value by monitoring the state of the packet memory.

As the priority outputting signal is output by various methods, the limit value for checking the state of the packet memory may be set by various methods. For example, when the priority outputting signal is output as two types of high or low, the limit values may be set as a first limit value for selectively controlling the packet flow of a port having the low priority, a second limit value for selectively controlling all ports having the low priority and the subsets of all ports having the high priority, and third limit value for controlling all ports.

The flow control judger 608 transfers the flow control signal corresponding to the output signal of the limit detector 606 to the flow controller 602. When the limit judger 606 outputs a signal for informing that the first limit value has been reached, the flow control judger 608 transmits the signal for directing to selectively control a port having the low priority to the flow controller 602. When the limit judger 606 outputs a signal for informing of reaching the second limit value, the flow control judger 608 transmits the signal for directing to control the flow of all ports having the low priority or a subset of the ports having the high priority to the flow controller 602.

The port state judging section 610 performs the function of determining the state of the port after receiving the bandwidth data and the priority data from the port control unit.

FIG. 11 is an example of a table for determining port states in a port state judging section.

That is, FIG. 11 shows an example of methods for determining the port state in case that the priority outputting section outputs the priority in the terms of high or low and the bandwidth judger outputs the priority in the terms of high or low.

As shown in FIG. 11, when the number of ports is eight, the port state judging section receives the priority outputting signal in the terms of high or low and the bandwidth outputting signal in the terms of high or low from the respective port control unit.

In FIG. 11, the port state judging section 610 performs the OR-gate operation using a priority outputting signal and a bandwidth outputting signal.

That is, when at least one of the priority outputting signal and the bandwidth outputting signal has a high signal, the port state judging section 610 determines the port state as high. Otherwise, the port state judging section 610 determines the port state as low.

It is also evident that the port state judging section can perform AND-gate operation using the priority outputting signal and bandwidth outputting signal according to an administrator's operation.

FIG. 12 shows another example of a table for determining port states in a port state judging section.

That is, FIG. 12 shows an example of methods for determining the port state regardless of the bandwidth outputting signal, in the case where the priority output signal is output as eight types of 1 to 8.

As mentioned above, the priority of the IP packet and the VLAN packet is assigned as any one from eight levels determined by a standard. FIG. 12 shows the case of determining the port state with respect to all priorities of the foregoing eight levels.

Therefore, the port state judging section outputs as the port state, the priority level of the priority outputting signal.

FIG. 12 shows the case where the bandwidth signal is not considered in generating the port state. However, those skilled in the art will appreciate that the port state can be determined in contemplation of the priorities shown in FIG. 12 accompanied by the bandwidth signal.

The flow control signal transmitting section 612 selects a port corresponding to the output signal of the flow control judger 608 using the port state information of the port state judging section, and transmits the flow control signal to the selected port.

For example, when the port state is determined by the method according to FIG. 11 and a signal for directing the flow control judger 608, which selectively controls the flow of a port having the low priority, is output, the flow control judger 612 transmits a flow control signal to the port control units. The port control units correspond to the selected ports from the ports having the low priority by monitoring the information in the port state judging section.

Figure 7:
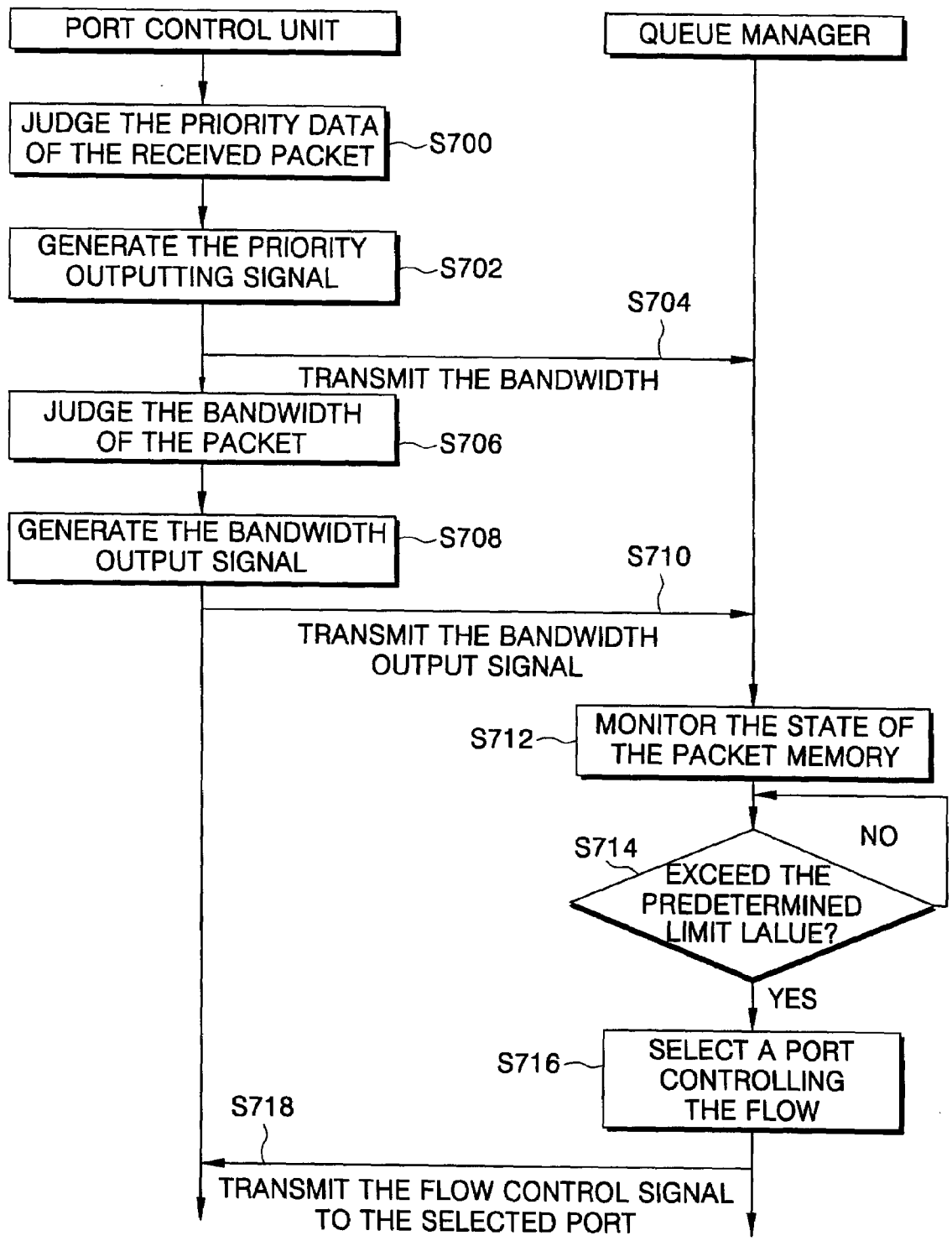
FIG. 7 is a flow chart illustrating the flow control method according to one embodiment of the present invention.

FIG. 7 is a flow chart illustrating the steps of a flow control method according to one embodiment of the present invention.

As shown in FIG. 7, the flow control method according to one embodiment of the present invention is performed by communication between the port control unit and the queue manager.

At step S700, the port control unit determines the priority data of the received packet. As mentioned above, the priority data can be assigned for a port or in the packet.

At step S702, the port control unit generates the priority outputting signal by determining the priority data of the packet. As mentioned above, the priority outputting signal may consist of two signals of a high signal and a low signal. In other embodiments, the priority outputting signal may consist of many signal types corresponding to the priority levels.

At step S704, the port control unit transmits the generated priority outputting signal to the queue manager.

At step S706, the port control unit determines the priority data of the received packet as well as the bandwidth data. The port control unit counts the received packet and calculates the average bandwidth by dividing the counted value by the predetermined time period.

At step S708, the port control unit generates the bandwidth output signal by determining whether the average bandwidth exceeds the predetermined critical value. As the priority output signal, the bandwidth output signal may take a variety of forms, according to the administrator's operation.

At step S710, the port control unit transmits the generated bandwidth output signal to the queue manager.

At step S712, the queue manager monitors the address pointer of the packet memory continuously. At step S714, the queue manager determines whether or not the address pointer exceeds the predetermined limit value. As mentioned above, the limit value of the packet memory may be set according to the type of the priority output signal.

At step S716, when the address pointer exceeds the predetermined limit value, the queue manager selects a port and the bandwidth output signal output from the port control unit. The port is used for controlling the flow using the priority output signal.

At step S718, when the port for controlling the flow is selected, the queue manager transmits the flow control signal to the selected port.

Figure 8:
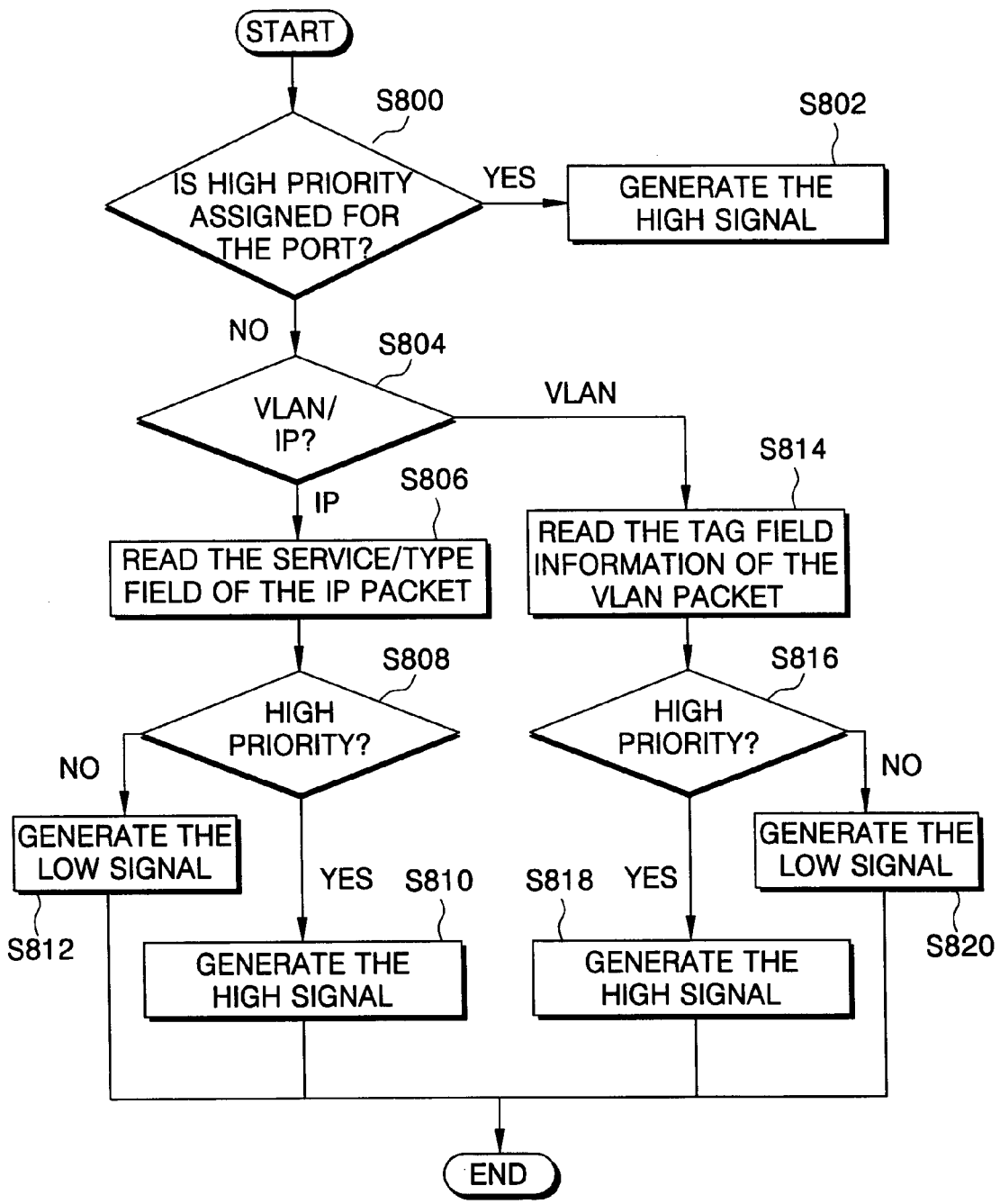
FIG. 8 is an example of a flow chart illustrating the steps of outputting a priority by the priority outputting section according to one embodiment of the present invention.

FIG. 8 is an example of a flow chart illustrating the steps of the outputting of a priority by the priority outputting section according to one embodiment of the present invention.

FIG. 8 shows the case that the priority outputting section outputs a high signal corresponding to the high priority and a low signal corresponding to the low priority. However, those skilled in the art will appreciate that the priority output signal can any of a number of other forms.

As shown in FIG. 8, at step S800, the priority data extracting section 300 of the priority outputting section determines whether or not the high priority is assigned for the port.

When the high priority is assigned for the port, the port priority data extracting section 302 generates the high signal at step S802.

At step S804, when the high priority is not assigned for the port, the priority data extracting section 300 determines whether the packet is a VLAN packet or an IP packet.

When the packet is an IP packet, the priority data extracting section 300 reads the service/type field of the IP packet at step S806.

At step S808, the IP priority outputting section 306 determines the priority of the IP packet using the information read by the priority data extracting section 300, and examines when the IP packet has the high priority. For example, when the priority of a packet is over the fifth level, the IP priority outputting section 306 may determine that the packet has the high priority. When the priority of a packet is under the fifth level, the IP priority outputting section 306 can determine that the packet has the low priority.

When the packet is determined as the high priority, the IP priority outputting section 306 outputs the high signal at step S810. However, when the packet is determined as the low priority, the IP priority outputting section 306 outputs the low signal at step S812.

When the packet is the VLAN packet, the priority data extracting section 300 reads the tag field information of the VLAN packet at step S814.

At step S816, the VLAN priority outputting section 304 determines the priority of the VLAN packet using the information read by the priority data extracting section 300. In addition, the VLAN priority outputting section 304 determines whether the VLAN packet has the high priority or the low priority. For example, the VLAN priority outputting section can determine the priority of the packet as the high priority when the priority is over the fifth level, and the VLAN priority outputting section can determine the priority of the packet as the low priority when the priority is under the fifth level.

When the VLAN priority outputting section 304 determines the priority the packet as the high priority, the VLAN priority outputting section 304 outputs the high signal at step S818. When the VLAN priority outputting section 304 determines the priority the packet as the low priority, the VLAN priority outputting section 304 outputs the low signal at step S820.

Figure 9:
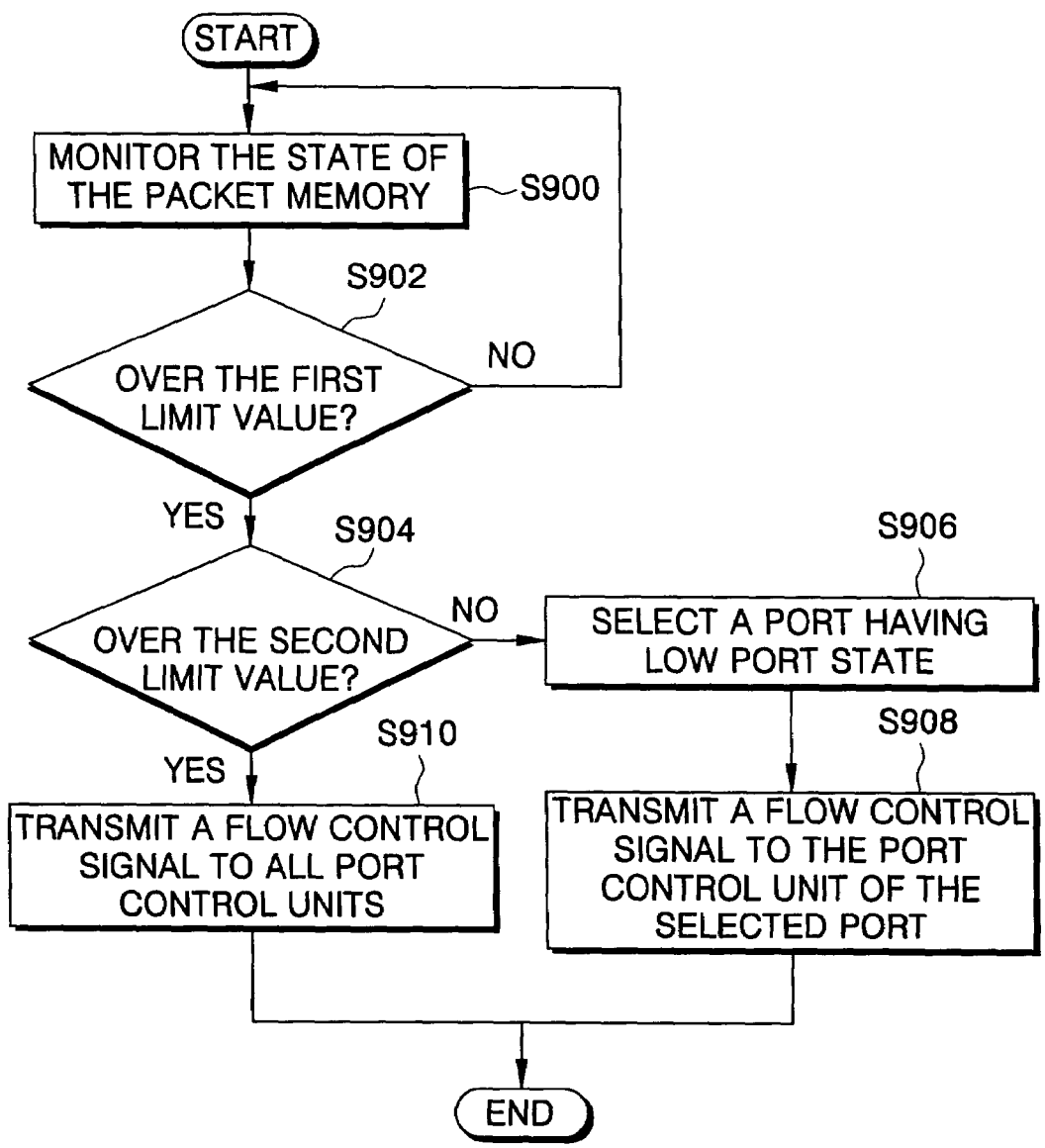
FIG. 9 is a flow chart illustrating the procedure by which a queue manager provides a flow control signal to a port control unit according to one embodiment of the present invention.

FIG. 9 is a flow chart illustrating the procedure that a queue manager provides a flow control signal to a port control unit according to one embodiment of the present invention.

FIG. 9 is a flow chart of an exemplary operation of the queue manager.

First, the port state judging section 610 of the queue manager determines the state of the port as shown in FIG. 11.

Second, when the address pointer of the packet memory reaches the first limit value, the flow control judging section 608 of the queue manager directs all ports having the low port state to control the flow. Then, when the address pointer of the packet memory reaches the second limit value, the flow control judging section 608 of the queue manager directs all ports to control the flow.

Under the foregoing conditions, the operation of the queue manager shall be described with reference to FIG. 9.

As shown in FIG. 9, at step S900, the queue manager monitors the state of the packet memory continuously.

At step S902, the limit value detecting section 606 of the queue manager examines whether the address pointer of the packet memory is over the first limit value.

At step S904, the limit value detecting section 606 of the queue manager examines whether the address pointer of the packet memory is over the second limit value.

When the address pointer of the packet memory is over the first limit value and under the second value, the flow control judging section transmits the signal for direct to control a port having low port state to the flow control signal transmitting section 612. After the flow control signal transmitting section 612 receives the signal from the flow control judging section 608, the flow control signal transmitting section selects a port having a low port state by inquiring the port state information of the port state judging section at step S906.

For example, when the port state shown in FIG. 11 is output, the flow control signal transmitting section 612 selects No. 3 port, No. 4 port, No. 6 port and No. 8 port.

When the port having the low port state is selected, the flow control signal transmitting section 612 transmits a flow control signal to the port control unit of the selected port at step S908. The port control unit receiving the flow control signal directs the connected MAC to control the flow, and the station receiving the flow control packet stops transmitting the packet during the time period determined in the flow control packet.

When the address pointer of the packet memory exceeds the second limit value, the flow control judging section 608 transmits a signal for directing to control the flow of all ports to the flow control signal transmitting section 612. The flow control signal transmitting section 612 transmits the flow control signal to all port control units at step S910.

Figure 10:
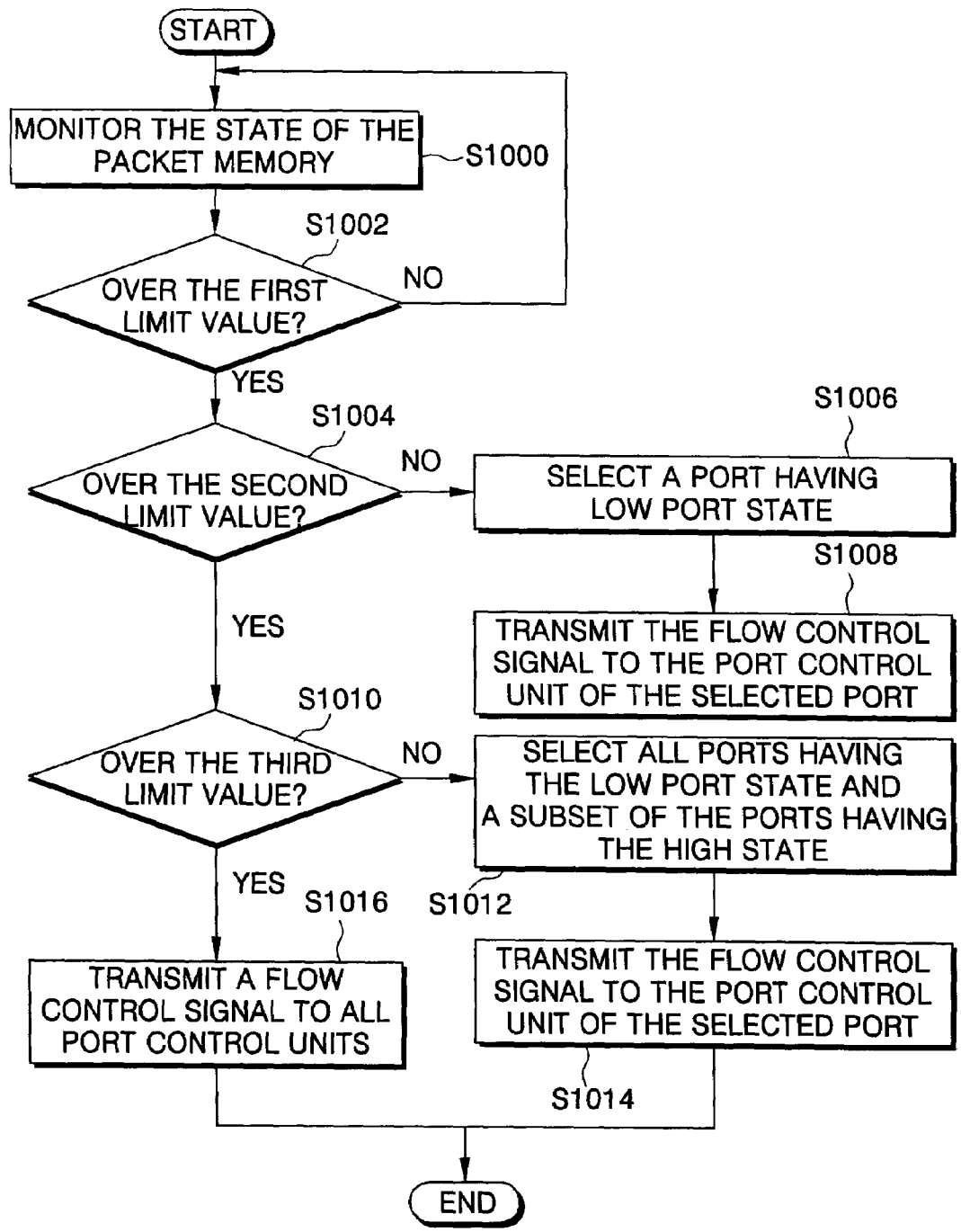
FIG. 10 is a flow chart illustrating the procedure by which a queue manager provides a flow control signal to a port control unit according to another embodiment of the present invention.

FIG. 10 is a flow chart illustrating the procedure, in which a queue manager provides a flow control signal to a port control unit according to another embodiment of the present invention. In FIG. 10, the queue manager is operated under following conditions.

First, the port state judging section 610 of the queue manager determines the state of the port as shown in FIG. 11.

Second, after flow control judging section 608 of the queue manager detects the first limit value, the second limit value and the third limit value, it directs to control the flow using the first limit value, the second limit value and the third limit value, respectively.

When the first limit value is detected, the flow control judging section 608 generates a signal for directing a port having the low port state to selectively control the flow.

When the second limit value is detected, the flow control judging section 608 generates a signal for directing all ports having the low port state and the subsets of all ports having the high port state to selectively control the flow.

When the third limit value is detected, the flow control judging section 608 generates a signal for directing all ports to selectively control the flow.

Under the foregoing conditions, the operation of the queue manager is now described with reference to FIG. 10.

As shown in FIG. 10, at step S1000, the queue manager monitors the address pointer of the packet memory continuously.

At step S1002, the limit value detecting section 606 of the queue manager examines when the address pointer of the packet memory is over the first limit value.

When the address pointer of the packet memory is over the first limit value, the limit value detecting section 606 examines when the address pointer is over the second limit value, at step S1004.

When the address pointer of the packet memory is over the first limit value and under the second value, the flow control judging section 608 transmits the signal for controlling selectively a port having low port state to the flow control signal transmitting section 612. The flow control signal transmitting section 612 selects a port of those ports having low port state using the port state information of the port state judging section at step S1006.

According to one embodiment of the present invention, the flow control signal transmitting section 612 can select a port of the ports having a low port state using the round-robin method.

According to another embodiment of the present invention, the flow control signal transmitting section 612 can select a port of the ports having a low port state using the pseudo-random method. In this case, it is desirable to make the pseudo-random code for the impartial selection of the ports.

At step S1008, the flow control signal transmitting section 612 transmits the flow control signal to the port control unit of the selected port.

At step S1010, when the address pointer has exceeded the second limit value, the limit value detecting section examines when the address pointer of the packet memory exceeds the third limit value.

When the address pointer of the packet memory is between the second limit value and the third limit value, the flow control judging section 608 transmits a signal for directing all ports having the low port state and a subset of the ports having the high state to control to the flow control signal transmitting section 612. The flow control signal transmitting section 612 selects all ports having the low port state and a subset of the ports having the high state using the information of the port state judging section at step S1012.

As mentioned above, the flow control signal transmitting section 612 can select a subset of the ports having the high state using the rounds-robin method or the pseudo-random method.

At step S1014, the flow control signal transmitting section 612 transmits the flow control signal to the port control unit of the selected port.

At step S1016, when the address pointer of the packet memory exceeds the third limit value, the flow control judging section 608 transmits a signal for directing all ports to control the flow to the flow control signal transmitting section 612, and the flow control signal transmitting section 612 transmits the flow control signal to the respective port control unit of the all ports.

That is, FIG. 9 and FIG. 10 illustrate the case where the output signal of the priority outputting section is a high signal or a low signal, and the limit value for determining the state of the packet memory is two or three. However, those skilled in the art will appreciate that the limit value for determining the type of the output signal of the priority outputting section and the state of the packet memory can be modified variously according to an administrator's operation. Also, those skilled in the art will appreciate that the control action performed when the limit value is detected can be modified variously according to administrator's operation.

For example, the priority output signal can be output as any one of eight types as mentioned above. Then, the number of the limit value for determining the state of the packet memory, in this example, can be eight or nine.

As mentioned above, according to the device and the method for controlling packet flow that control the packet flow by use of priority data designated to packet or port, it is possible to control the packet flow in consideration of various kinds of network services.

Also, according to the present invention, it is possible to selectively control the port where packet flow control is needed by use of priority data and bandwidth data.

Although the present invention has been described in connection with the preferred embodiments with reference to the accompanying drawings, the preferred embodiments are intended not to limit the invention but to exemplify best modes of the present invention. It will be understood by those skilled in the art that various changes or modifications may be made thereto without departing from the spirit and scope of the present invention. Therefore, the present invention is defined only by the appended claims, which should be construed as covering such changes or modifications.

What is claimed is:

1. A method for controlling packet flow, comprising:
   determining priority data of a packet received by one of a plurality of ports, wherein the priority data are determined by:
     determining whether the priority data are designated to the one of the plurality of ports at which the packet is received or whether the priority data are designated to the packet and by outputting a first signal when the priority data is designated to the one of the plurality of ports at which the packet is received and a second signal when the priority data is not designated to the one of the plurality of ports at which the packet is received;
     determining whether the packet is a VLAN packet or an IP packet when the priority data is designated to the packet; and
     determining a priority by reading a priority field data of the VLAN packet or the IP packet and by outputting a third signal when the priority of the VLAN packet or the IP packet is over a predetermined critical value and outputting a fourth signal when the priority of the VLAN packet or the IP packet is under the predetermined critical value in the case where the priority data is designated to the VLAN packet or the IP packet;
   measuring bandwidth data of each port;
   outputting state data of each port of the plurality of ports by using the priority data and the bandwidth data;
   determining whether an address pointer of a packet memory exceeds a predetermined limit value by monitoring the packet memory;
   selecting at least one port of the plurality of ports to control packet flowby using the state data when the address pointer of the packet memory exceeds the predetermined limit value; and
   directing the selected at least one port to control the packet flow.

2. The method of claim 1, wherein the bandwidth data are measured by:
   counting the number of packets received by the one of the plurality of ports at which the packet is received;
   calculating an average bandwidth by dividing the number of packets by a predetermined time period; and
   outputting a first signal when the average bandwidth exceeds a predetermined critical value and a second signal when the average bandwidth does not exceed the predetermined critical value.

3. The method of claim 1, wherein when outputting state data, an OR operation of a signal resulting from the priority determination and a signal related to the bandwidth are output.

4. The method of claim 3, wherein the at least one port is selected by:
   selecting a subset of ports of which state output data are first state when the address pointer exceeds a first limit value;
   selecting all ports of which state output data are first state and a subset of ports of which state output data are second state when the address pointer exceeds a second limit value that is higher than the first limit value; and
   selecting all ports when the address pointer exceeds a third limit value that is higher than the second limit value.

5. The method of claim 1, wherein when outputting state data, an AND operation of a signal resulting from the priority determination and a signal related to the bandwidth are output.

6. The method of claim 1, wherein the at least one port is selected by:
   selecting all ports of which state output data are first state among the plurality of ports when the address pointer exceeds a first limit value; and
   selecting all ports when the address pointer exceeds a second limit value that is higher than the first limit value.

7. A packet flow control device comprising:
   a plurality of port control units being respectively coupled to a plurality of ports for determining priority data of a packet received by a port, wherein each of the plurality of port control units comprises:
     a bandwidth control section for measuring bandwidth data of a port;
     a priority outputting section for determining the priority data of a packet received by the port; wherein the priority outputting section comprises:

a priority data extracting section for determining whether the priority data are designated to the port or whether the priority data are designated to the packet and outputting a first signal when the priority data is designated to the one of the plurality of ports at which the packet is received and a second signal when the priority data is not designated to the one of the plurality of ports at which the packet is received, for determining whether the packet is a VLAN packet or an IP packet when the priority data is designated to the packet, and for determining the priority data by reading a priority field data of the VLAN packet or the IP packet;

a port priority outputting section for outputting a port priority data when the priority data is designated to the port;

a VLAN priority outputting section for determining the priority of the VLAN packet by using the read priority data when the priority data is designated to VLAN packet; and an IP priority outputting section for determining the priority of the IP packet by using the read priority data when the priority data is designated to the IP packet, the priority outputting section further outputting a third signal when the priority of the VLAN packet or the IP packet is over a predetermined critical value and a fourth signal when the priority of the VLAN packet or the IP packet is under the predetermined critical value in the case where the priority data is desianated to the VLAN packet or the IP packet; and a flow control directing section for requesting a port to produce a flow control packet in response to a flow control signal for directing the flow control from said queue manager; and a queue manager for monitoring a state of a packet memory, and for selecting at least one flow control port to direct flow control by using the priority data determined by the port control units when an address pointer of the packet memory exceeds a predetermined limit value.

8. The packet flow control device of claim 7, wherein the bandwidth control section comprises:

a counter for counting the number of packets received by the port;

a bandwidth calculating section for calculating an average bandwidth by dividing the counted number by a predetermined time period; and a comparing section for determining whether the average bandwidth exceeds a predetermined critical value.

9. The packet flow control device of claim 7, wherein the queue manager comprises:

a limit value detecting section for detecting whether the address pointer exceeds the limit value;

a flow control determining section for directing the at least one flow control port in a predetermined state to control the packet flow when the address pointer exceeds the limit value;

a port state determining section for determining the state of the port by receiving output signal of the bandwidth control section and the priority outputting section; and a flow control signal transmitting section for selecting the at least one flow control port in the predetermined state according to the data output by the port state determining section and transmitting a flow control signal to the port control unit of the selected at least one flow control port in response to a flow control direction of the flow control directing section.

10. The packet flow control device of claim 9, wherein the flow control signal transmitting section selects all ports having the low priority among the plurality of ports when the address pointer exceeds a first limit value, and selects all ports when the address pointer exceeds a second limit value that is higher than the first limit value.

11. The packet flow control device of claim 9, wherein the flow control signal transmitting section selects a subset of ports having the low priority when the address pointer exceeds a first limit value, selects all ports having the low priority and a subset of ports having the high priority when the address pointer exceeds a second limit value that is higher than the first limit value, and selects all ports when the address pointer exceeds a third limit value that is higher than the second limit value.

12. The packet flow control device of claim 9, wherein the bandwidth control section and the priority outputting section output a signal of high state or low state according to the bandwidth and the priority, wherein the port state determining-section determines the state of the port by performing OR operation of the output signals of the bandwidth control section and the priority outputting section.

13. The packet flow control device of claim 12, wherein the flow control signal transmitting section selects all ports of which state data are a first signal from among the plurality of ports when the address pointer exceeds a first limit value, and selects all ports when the address pointer exceeds a second limit value that is higher than the first limit value.

14. The packet flow control device of claim 12, wherein the flow control signal transmitting section selects a subset of ports of which state data are a first signal when the address pointer exceeds a first limit value, selects all ports of which state data are a first signal and a subset of ports of which state data are a second signal when the address pointer exceeds a second limit value that is higher than the first limit value, and selects all ports when the address pointer exceeds a third limit value that is higher than the second limit value.

15. The packet flow control device of claim 9, wherein the bandwidth control section and the priority outputting section output a signal of high state or low state according to the bandwidth and the priority, wherein the port state determining section determines the state of the port by performing an AND operation of the output signals of the bandwidth control section and the priority outputting section.

* * * * *

UNITED STATES PATENT AND TRADEMARK OFFICE
CERTIFICATE OF CORRECTION

| | | |
|---|---|---|
| PATENT NO. | : 7,146,438 B2 | Page 1 of 1 |
| APPLICATION NO. | : 10/694696 | |
| DATED | : December 5, 2006 | |
| INVENTOR(S) | : Kyu-Wook Han | |

It is certified that error appears in the above-identified patent and that said Letters Patent is hereby corrected as shown below:

Column 15, line 31, delete "desianted" and insert --designated--.

Signed and Sealed this

Twenty-fourth Day of April, 2007

JON W. DUDAS
*Director of the United States Patent and Trademark Office*